United States Patent [19]
Miyazaki et al.

[11] Patent Number: 5,742,476
[45] Date of Patent: Apr. 21, 1998

[54] INFORMATION PROCESSING APPARATUS WITH POSITIONERS CORRESPONDING TO DISPLAY INPUT REGION

[75] Inventors: Nobuhiko Miyazaki, Yao; Kyoko Gamo, Ikoma-gun, both of Japan

[73] Assignee: Sharp Kabushiki Kaisha, Osaka, Japan

[21] Appl. No.: 637,234

[22] Filed: Apr. 24, 1996

[30] Foreign Application Priority Data

Apr. 26, 1995 [JP] Japan .................. 7-102232

[51] Int. Cl.⁶ .................. G06F 1/16; H05K 5/02
[52] U.S. Cl. .................. 361/683; 361/681; 345/173
[58] Field of Search .................. 361/680, 681, 361/682, 683; 364/708.1, 709.11, 709.15; 345/169, 172, 173, 901, 902, 905

[56] References Cited

U.S. PATENT DOCUMENTS

| | | | |
|---|---|---|---|
| 4,667,299 | 5/1987 | Dunn | 364/708.1 |
| 5,347,630 | 9/1994 | Ishizawa et al. | 395/164 |
| 5,508,911 | 4/1996 | Vanko et al. | 364/188 |
| 5,568,357 | 10/1996 | Kochis et al. | 361/681 |
| 5,572,573 | 11/1996 | Sylvan et al. | 379/61 |

FOREIGN PATENT DOCUMENTS

| | | |
|---|---|---|
| 0622723 | 11/1994 | European Pat. Off. . |
| 62-31336 | 2/1987 | Japan . |
| 62-31337 | 2/1987 | Japan . |
| 1-72630 | 5/1989 | Japan . |
| 1-142034 | 9/1989 | Japan . |
| 3-9033 | 1/1991 | Japan . |
| 4007615 | 1/1992 | Japan . |

*Primary Examiner*—Lynn D. Feild
*Attorney, Agent, or Firm*—David G. Conlin; Brian L. Michaelis

[57] ABSTRACT

An information processing apparatus comprising: a body having an opening; a display/input panel disposed in the opening which includes a display region for displaying information and an input region for displaying keys for inputting data, the data being input by touching the keys; and positioners provided on the body in the vicinity of the opening corresponding to the input region, for indicating the input region. The positioners are convertible between a first position in which they protrude from a surface of the body to be sensed and a second position in which they are accommodated in the body so as not to protrude from the surface of the body.

12 Claims, 10 Drawing Sheets

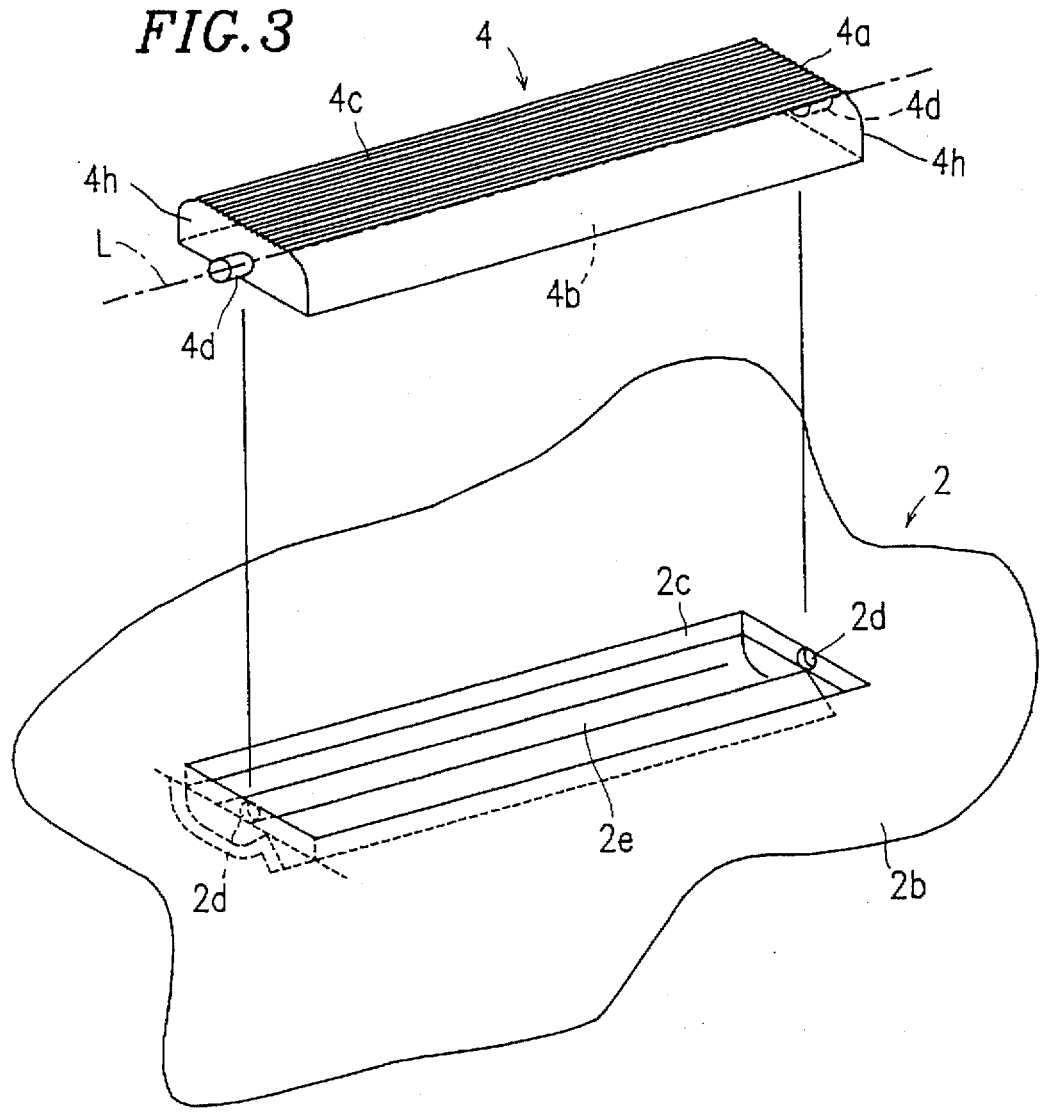

INFORMATION PROCESSING APPARATUS WITH POSITIONERS CORRESPONDING TO DISPLAY INPUT REGION

BACKGROUND OF THE INVENTION

1. Field of the Invention

The present invention relates to information processing apparatuses such as computers, workstation terminals, word processors, electronic registers, data processors, portable information devices, and the like. More particularly, the present invention relates to information processing apparatuses including display/input panels on which information is displayed and through which data is input.

2. Description of the Related Art

Recently, information processing apparatuses having display panels which is used for displaying and inputting data have advanced in popularity. In such information apparatuses, the display panels include data input regions for inputting data and display regions for displaying information such as characters, figures, symbols, and the like. Data is input by touching (usually, with the fingers of an operator) a key or key region displayed in a data input region of the display panel. This kind of data input method is referred to as "touch-key input". In order to input data, operators have to find visually an appropriate key (or key region) displayed in the input region, identify a position of the key, and touch the key with his or her finger of the like so as to input the data. This makes it difficult for operators to input data quickly and to perform concurrent operations such as blind-touch data input.

A conventional method for helping operators distinguish keys on keyboards has been to provide positioners or markers which indicate positions of the keys on the keyboards (input devices) in order to input data quickly and correctly. For example, Japanese Utility Model Laid Open Publication No. 3-9033 describes a home position guide for a keyboard. The home position guide has guide grooves for guiding the fingers of an operator to predetermined key positions. Japanese Utility Model Laid Open Publication No. 1-142034 proposes key-top caps each having a projection of a specific shape, so as to help operators to identify the keys. The key-top caps are removable. Japanese Utility Model Laid Open Publication No. 1-72630 discloses a keyboard cover panel provided with holes through which corresponding keys come out. The cover panel has sensing marks each formed close to the hole and indicating the corresponding key. Operators can identify the key by touching the sensing mark.

Japanese Utility Model Laid Open Publications No. 62-31336 and No. 62-31337 disclose transparent keyboard devices which include key switches. In a transparent keyboard device, key symbols such as characters, numerals and the like are provided behind the transparent key switches. Operators see the key symbols through the transparent key switches, and touch the key switch so as to input data corresponding to the key symbol. Protuberant marks are provided on a surface of the transparent keyboard device, along boundaries between the key switches or at a center portion of each of the key switches. The protuberant marks help operators to identify positions of the key switches.

The above mentioned positioners and marks are provided at fixed positions on the data input devices. It is relatively easy for operators to identify fixed positions of the keys, because they are more memorable and thus lead to habit. However, in information processing apparatuses utilizing the "touch-key input" method in which keys are displayed in input regions of display panels, the position and size of the keys are typically variable rather than fixed. Displaying keys having arbitrary size and/or arbitrary positions is one of the advantages of information processing apparatuses comprising "touch-key input" display panels.

The conventional positioners and marks such as those discussed above are not adaptable to changes in position and size of the keys, but limited to in that all key positions and sizes are fixed. Respective positioners or marks may be provided with respect to each variation of position and size of the keys. However, such provision increases costs of the information apparatuses. Furthermore, it is troublesome for operators to exchange the positioners or marks each time the keys are changed and to keep track of substitute positioners or marks so as not to become misplaced.

SUMMARY OF THE INVENTION

The information processing apparatus of this invention, comprises a body having an opening; a display/input panel disposed in the opening, including a display region for displaying information and an input region for displaying keys for inputting data, the data being input by touching the keys; and positioners provided on the body in the vicinity of the opening corresponding to the input region, for indicating the input region.

Preferably, the positioners are convertible between a first position in which the positioners protrude from a surface of the body to be sensed and a second position in which the positioners are accommodated in the body so as not to protrude from the surface of the body.

In one embodiment of the invention, the body may comprise concave portions provided with respect to the positioners for accommodating the positioners so as to be rotatable between the first and second position; and holding members provided in the respective concave portions for respectively fixing the positioners at the first or second position.

Each of the positioners may rotate around an axis, the axis being engaged in axis holes which are provided in the concave portion, and each of the holding members may be an elastic member.

Each of the positioners may include a rugged face on a portion which is a top face when the positioner is at the first position protruding from the surface of the body.

In another embodiment of the invention, the body may comprise: concave portions provided with respect to the positioners for accommodating the positioners so as to be slidable between the first and second position; guide slots for guiding slide motion of the respective positioners; and holding members provided in the respective concave portions for respectively fixing the positioners at the first or second position.

Each of the positioners may have projection members for engaging in the guide slots so as to slide guided by the guide slots, and the holding members may be elastic members.

Each of the positioners may include a rugged face on a portion which is a top face when the positioner is at the first position protruding from the surface of the body.

The input region may be placed along at least an edge of the opening and may include a plurality of key regions, and the positioners may be provided for at least each boundary of the key regions.

The input region may be divided into a plurality of sub-regions, a key being displayed using at least one sub-region, and the positioners may be provided for at least each boundary of the sub-regions, positioners corresponding to a boundary of the keys being set at the first position, while positioners not corresponding to a boundary of the keys being set at the second position.

The input region may be provided in both sides in the display/input panel along corresponding edges of the opening, and may include a plurality of key regions, and the body may comprise a pair of positioners each provided for the corresponding input region.

The information processing apparatus may further comprise positioners provided on the body corresponding to boundaries between the display region and the input regions.

Thus, the invention described herein makes possible the advantages of (1) providing an information processing apparatus for realizing quick and accurate input of data via an input region displayed in a display panel by providing positioners indicating the input region, and (2) improving data input operability of the information processing apparatus by providing positioners which are adaptable to changes in position and size of keys in the input region.

These and other advantages of the present invention will become apparent to those skilled in the art upon reading and understanding the following detailed description with reference to the accompanying figures.

BRIEF DESCRIPTION OF THE DRAWINGS

FIG. 3 is an exploded view showing a structure of a positioner according to one embodiment of the present invention.

DESCRIPTION OF THE PREFERRED EMBODIMENTS

Hereinafter, the present invention will be described by way of illustrative examples with reference to the accompanying drawings.

EXAMPLE 1

Figures 1A, 1B:
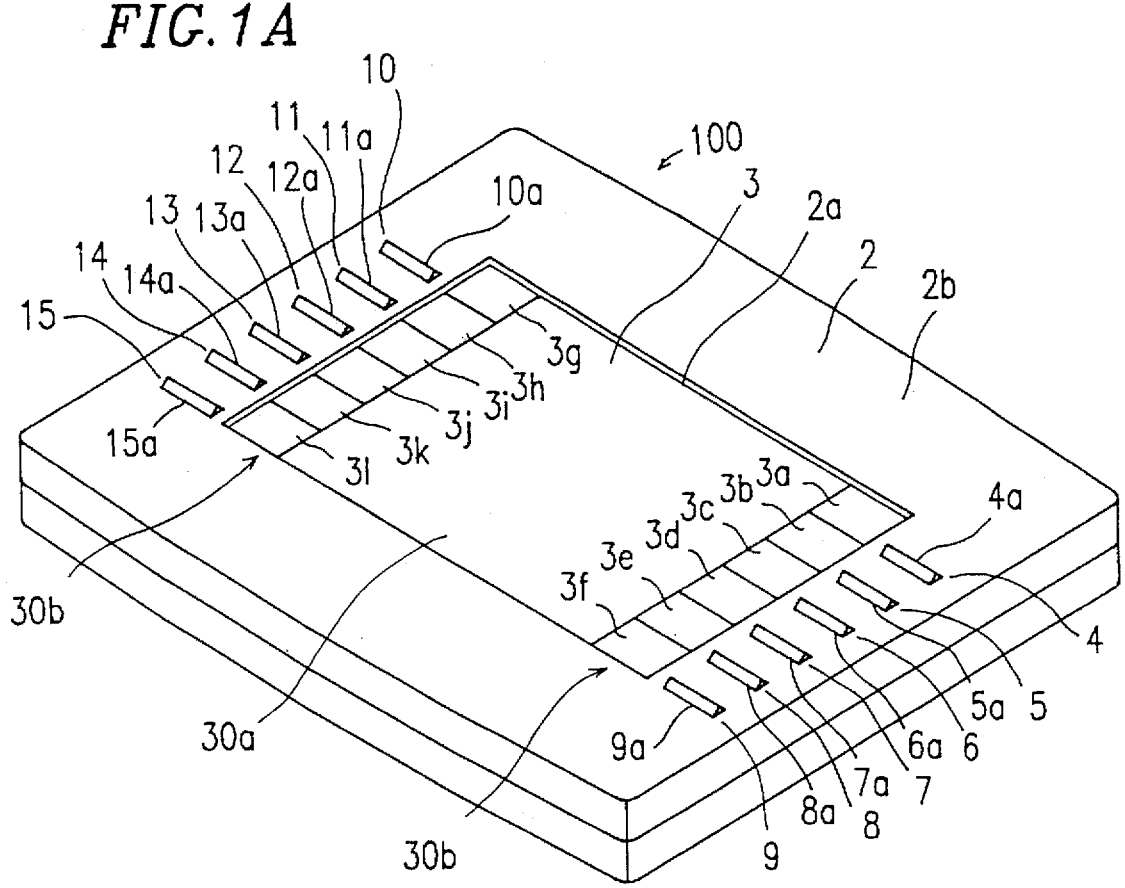
FIG. 1A is a perspective view showing a structure of an information processing apparatus of the present invention.
FIG. 1B is a diagram demonstrating keys displayed in a input region of a display panel and conditions of the corresponding positioners of the information processing apparatus as shown in FIG. 1A.

FIG. 1A shows an overall structure of an information processing apparatus 100 according to a first example of the present invention. As shown in FIG. 1A, the information processing apparatus 100 includes a body 2 having an opening 2a in the center thereof, a display panel 3 disposed in the opening 2a, and positioners 4–15 provided on a surface 2b of the body 2. The positioners 4–15 are placed in the vicinity of the opening 2a along the sides thereof.

The display panel 3 includes a display region 30a for displaying information and input regions 30b for displaying keys 3a–31 for inputting data. Data is input to the information processing apparatus 100 by touching the keys 3a–31 displayed in the input regions 30b of the display panel 3. The number, position and size of the keys 3a–31 are variable in the input region 30b. A display panel including a display region and an input region such as the display panel 3 is referred to a display/input panel in this specification.

As shown in FIG. 1A, the input regions 30b are provided on opposite sides of the display panel 3 in this example. The keys are displayed, for example, by dividing the input regions 30b into a plurality of subregions and by framing a necessary number of sub-regions. Respective functions of the keys are represented by characters, figures, symbols and the like (i.e., function information) displayed in the framed sub-regions. Operators touch a key so as to input data or a command corresponding to the key via the display panel 3.

Figure 2A:
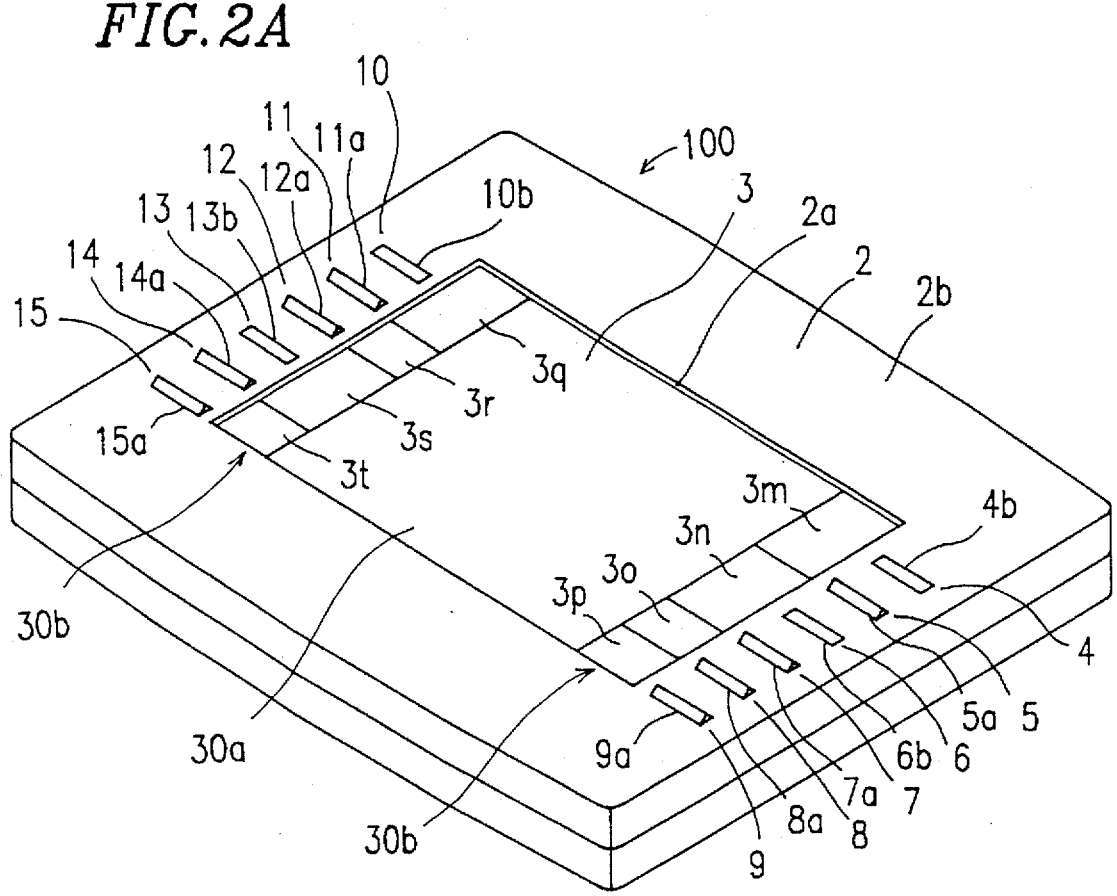
FIG. 2A is a perspective view showing a structure of the information processing apparatus of the present invention in which different keys are displayed in the input region.
Figure 2B:
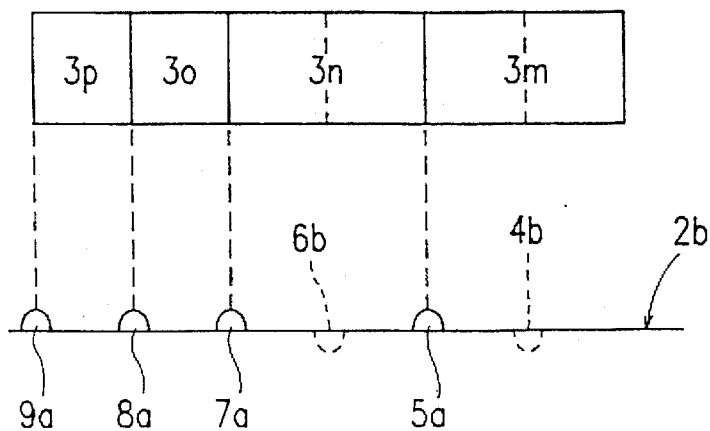
FIG. 2B is a diagram demonstrating keys displayed in a input region of the display panel and conditions of the corresponding positioners of the information processing apparatus as shown in FIG. 2A.

In this example, as shown in FIGS. 1B and 2B, each key is displayed using at least one sub-region and can be displayed using an arbitrary number of subregions. For example, in FIGS. 1B, each of the keys 3a–31 corresponds to one sub-region. In FIG. 2B, keys 3o and 3p are displayed using one sub-region, respectively, while keys 3m and 3n are displayed using two sub-regions, respectively.

The positioners 4–15 are located so as to correspond to the input region 30b in the vicinity of the opening 2a, helping operators to distinguish the position of the input regions 30b. Each of the positioners 4–15 is convertible from a first position in which the positioner protrudes from the surface 2b of the body 2 to a second position accommodated in the body 2 so as not to be protrude from the surface 2b, and vice versa.

In the first position, a sensing portion of the respective positioners (denoted by the suffix "a") extends beyond the surface 2b. Thus, operators can sense the positioners 4–15 at the respective first positions via the sensing portions 4a–15a protruding from the surface 2b. In the second position, preferably, the positioners 4–15 are accommodated in the body 2 so as to be flush along the surface 2b. The positioners 4–15 may be slightly lower than the surface 2b in the second position.

The positioners 4–15 are provided so as to correspond to boundaries of sub-regions, for example, positioners 4–8, and an edge of the opening 2a (or one end of the input region 30b), for example, positioner 9, as shown in FIGS. 1A to 2B. The positioners which correspond to boundaries of the keys or one end of the input region 30b are set in the first position in which they protrude from the surface 2b, as exemplified in FIG. 4. The positioners which do not correspond to boundaries of the keys (or any end of the input region 30b) are set in the second position in which they are accommodated in the body 2, as exemplified in FIG. 5.

For example, as shown in FIGS. 1A and 1B, in the case where twelve keys 3a–31 are displayed in the input regions 30b of the information processing apparatus 100, each of the positioners 4–15 corresponds to a boundary of the keys or an edge of the opening 2a. Thus, the positioners 4–15 are all set at the first position with the respective sensing portions (e.g., 4a–9a) protruding from the surface 2b. The manner in which such setting actually takes place is described more fully below.

FIGS. 2A and 2B show the case where eight keys 3m–3t are displayed in the input regions 30b of the information processing apparatus 100. For example, as shown in FIG. 2B, keys 3m and 3n are displayed larger than other keys as they each encompass two sub-regions. The positioners 5 and 7–9 which correspond to boundaries of the keys or an end of the input region 30b are set at the first position in which the respective sensing portions 5a and 7a–9a are protruding from the surface 2b (see, e.g., FIG. 4). The positioners 4 and 6 which do not correspond to boundaries of the keys or an end of the input region 30b are set at the second position accommodated in the body 2 in which respective flat bottom faces 4b and 6b appear so as to be flat along the surface 2b (see, e.g., FIG. 5).

The positioners at the first position form sensing protuberances by which operators can easily distinguish the positions and boundaries of the keys. This makes it possible for operators to realize quick and accurate data input, since the operators do not have to look for an appropriate key to find the position every time to input data. In addition, a positioner corresponding to an end of the input region 30b (or an edge of the opening 2a) is also set at the first position. Thus, the protruding positioners and the displayed keys have one to one correspondence, making it easy for operators to distinguish the keys.

The positioners are convertible in accordance with the position and size of the displayed keys. Therefore, operators can input data quickly and accurately even when keys are changed in their position and size, as the operators are assisted by the positioners which are set to protrude corresponding the keys currently displayed.

The number and position of the positioners and keys are not limited to the examples shown in FIGS. 1A to 2B. The input regions 30b are provided in the opposite sides of the display panel 3 in FIGS. 1A to 2B. However, the display panel 3 may includes a single input region on one side, or may includes input regions along adjacent sides.

An exemplary structure of the positioners 4–15 will now be described in detail. FIG. 3 illustrates a structure of the positioner 4, for example. The structure of other positioners 5–15 is the same as that of positioner 4.

As shown in FIG. 3, the positioner 4 has a semicylindrical shape and includes a flat bottom face 4b and a sensing portion 4a protruding opposite the bottom face 4b. The positioner 4 has a rotation axis L along an elongate direction thereof. The positioner 4 includes projecting members 4d which are provided on side faces 4h of the positioner 4 perpendicular to the rotation axis L. The projecting members 4d project from the respective side faces 4h along the rotation axis L.

Figure 4:
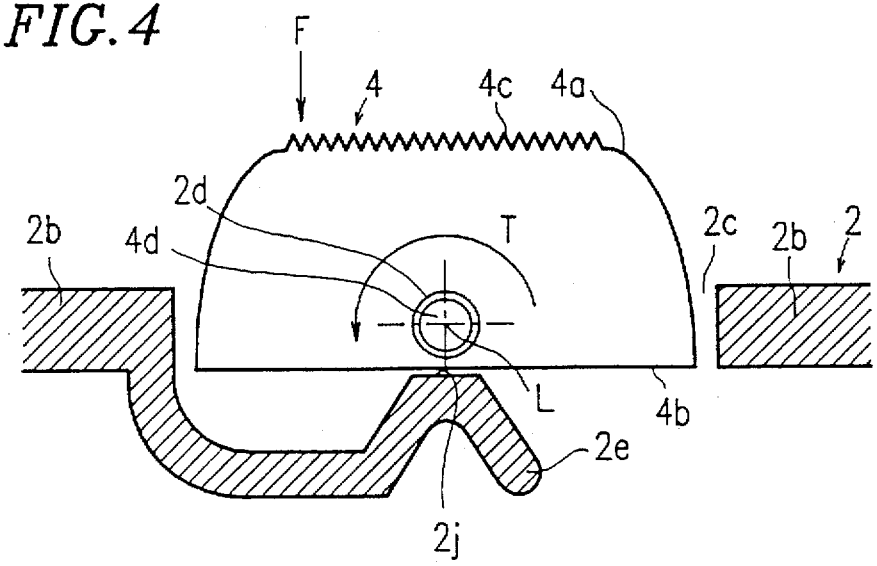
FIG. 4 is a cross sectional view showing the positioner of FIG. 3 in a condition protruding from a surface of the body of the information processing apparatus.
Figure 5:
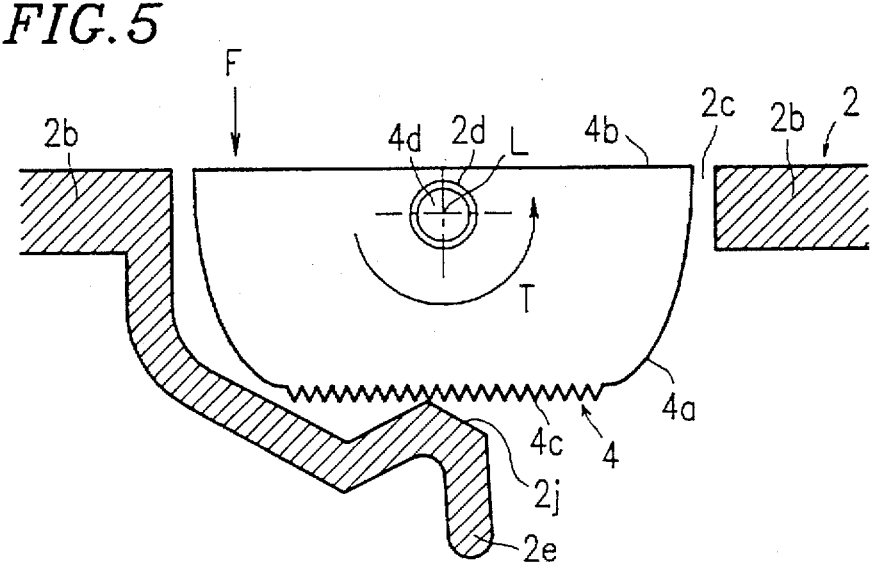
FIG. 5 is a cross sectional view showing the positioner of FIG. 3 in a condition accommodated in the body of the information processing apparatus so as to be essentially flush with the surface thereof.

As shown in FIG. 3, the body 2 has a concave portion 2c having an opening for receiving the positioner 4. Axis holes 2d for receiving the corresponding projecting members 4d are provided on edge portions of the body 2 inside the concave portion 2c. The positioner 4 is pivotablly accommodated in the concave potion 2c with the projecting members 4d engaged in the axis holes 2d. The positioner 4 is pivotable around the rotation axis L. An elastic member 2e is provided in the concave portion 2c for holding the positioner 4 at a predetermined position. The elastic member 2e may be a kind of spring member which is molded with the body 2 as shown in FIGS. 4 and 5. For example, the elastic member 2e can be implemented by a leaf spring made of plastic. The elastic member 2e may also be a separate spring member and attached to the body 2.

The positioner 4 includes a rugged face 4c formed on the top of the sensing portion 4a. The rugged face 4c helps operators to sense the positioner 4 with their fingers. The rugged face 4c increases friction between the positioner 4 and a finger, so that it helps operators to rotate the positioner 4 so as to convert from the first position to the second position.

FIGS. 4 and 5 show a cross sectional structure and operation of the positioner 4. FIG. 4 shows the positioner 4 at the first position protruding from the surface 2b of the body 2. As shown in FIG. 4, the elastic member 2e extends from the body 2 and has an arm shape in a cross section. An end portion of the elastic member 2e is bent so as to form an engager 2j having a flat portion. The flat portion of the engager 2j engages with the bottom face 4b so as to press the positioner 4 upward with its elastic force. The flat portion of the engager 2j abuts the flat bottom face 4b so as to prevent the positioner 4 from rotating, so that the positioner 4 is fixed at the first position.

When the keys displayed in the input regions 30b are changed so that the positioner 4 does not correspond to a boundary of the keys, the positioner 4 is manually rotated around the rotation axis L to the second position as shown in FIG. 5. As shown in FIG. 5, the positioner 4 at the second position is accommodated in the body 2 so as to be flush along the surface 2b of the body 2. The elastic member 2e holds the positioner 4 by engaging the engager 2j with the rugged face 4c of the positioner 4. As shown in FIG. 5, the elastic member 2e hooks the positioner 4. Relatively large friction of the rugged face 4c helps the positioner 4 to be hooked well into position.

The rotation of the positioner 4 is preformed against the elastic force of the elastic member 2e by pressing on the positioner 4 with a finger of an operator or a tip of a thin member such as a ball point pen. Such pressing is preferably exerted with a force represented by arrow F at the edge of the positioner 4 so as to exert a torque on the positioner 4 about the rotation axis L as represented by arrow T. When the rotation is completed 180° to the first or second position, the elastic member 2e engages and holds the positioner 4 at the first or second position with the elastic force and friction.

As described above, the positioners can change respective conditions (protruding or flush) according to the position and size of the keys, so as to indicate the necessary positions of the keys and to be sensed by operators with the sensing portions thereof. Therefore, operators can easily find and distinguish the keys even when position and size of the keys are changed, by sensing the positioners indicating the keys. This makes it possible to realize efficient data input.

Figure 6:
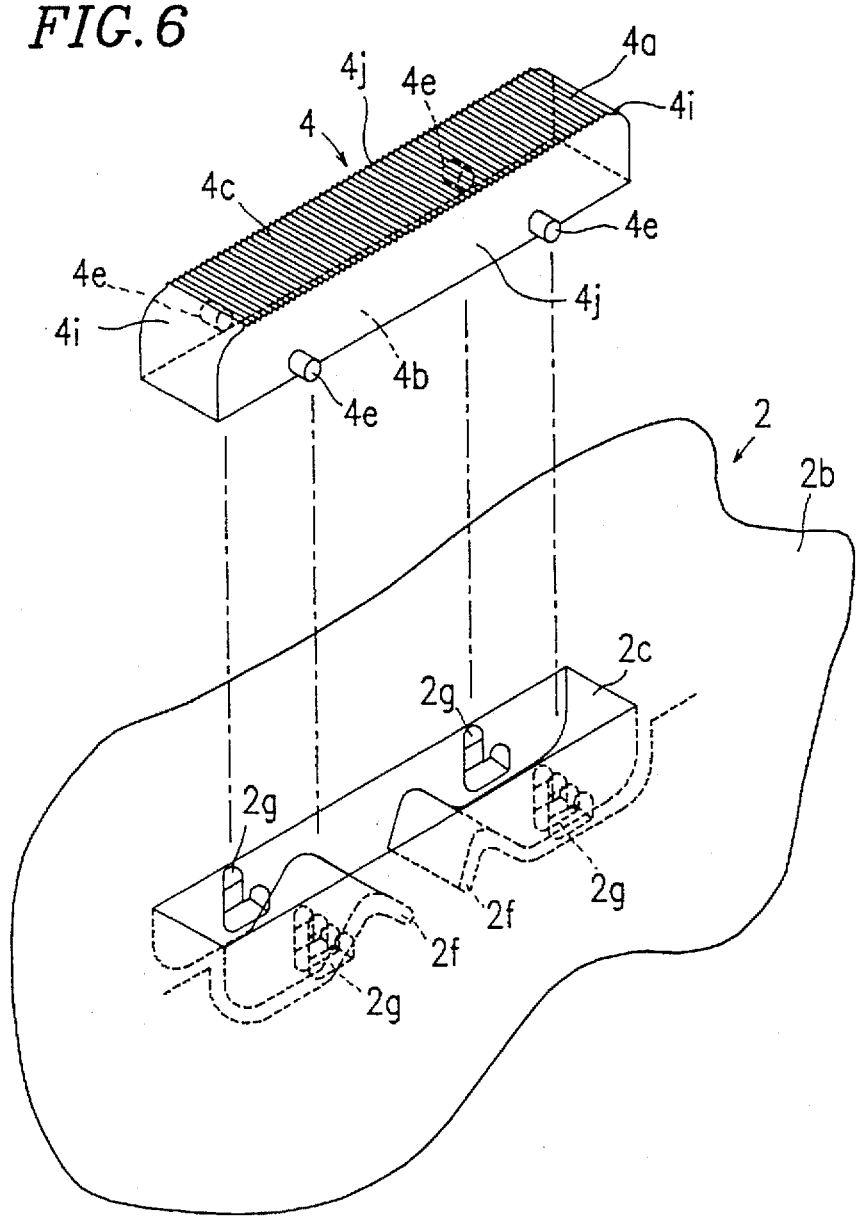
FIG. 6 is an exploded view showing a structure of a positioner according to another embodiment of the present invention.

Another exemplary structure of the positioners 4–15 will be described with reference to FIGS. 6–8. FIG. 6 illustrates another structure of the positioner 4. Again, the structure of other positioners 5–15 is the same as that of positioner 4.

As shown in FIG. 6, the positioner 4 has a rectangular parallelepiped shape and includes a flat bottom face 4b and a sensing portion 4a opposite the bottom face 4b. Two edges 4i which are included in the sensing portion 4a and perpendicular to an elongate direction of the positioner 4 are rounded. The positioner 4 includes a pair of projecting members 4e on each side face 4j parallel to the elongate direction.

As shown in FIG. 6, the body 2 has a concave portion 2c in the surface 2b with an opening for receiving the positioner 4. Guide slots 2g having an L-shape are provided on inner side faces of the concave portion 2c so as to receive the corresponding projecting members 4e. The positioner 4 is slidably accommodated in the concave potion 2c with the projecting members 4e engaged in the corresponding guide slots 2g. The positioner 4 is slidably guided by the L-shaped guide slots 2g in the concave portion 2c in directions perpendicular and parallel to the elongate direction of the positioner 4. A pair of elastic members 2f are provided in the concave portion 2c for holding the positioner 4 at a predetermined position, i.e., a first or second position. Each of the elastic members 2f may be a kind of spring member which is molded with the body 2 as shown in FIGS. 7 and 8. For example, the elastic members 2f can be implemented by leaf springs made of plastic. The elastic members 2f may also be separate spring members and attached to the body 2.

The positioner 4 includes a rugged face 4c formed on the top of the sensing portion 4a. The rugged face 4c helps operators to sense the positioner 4 with their fingers. The rugged face 4c increases friction between the positioner 4 and a finger, so that it helps operators to slide the positioner 4 so as to convert from the first position to the second position and vice versa.

Figure 7:
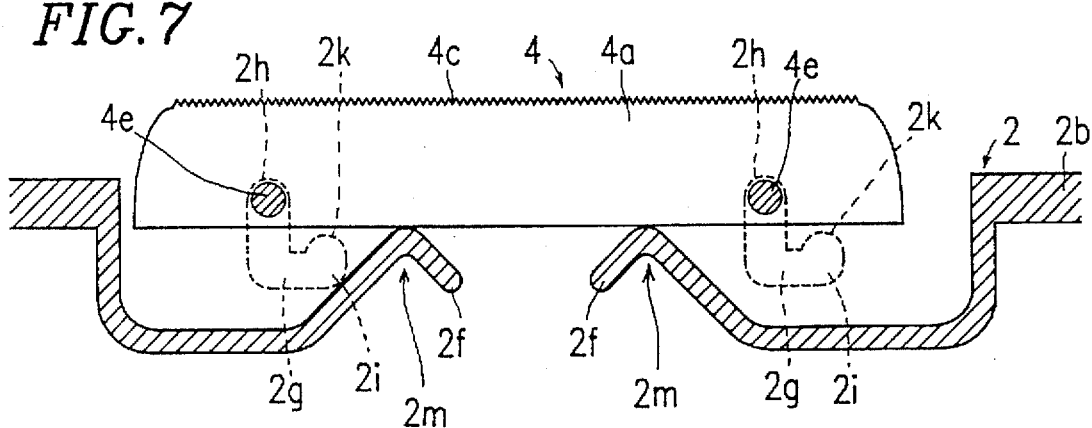
FIG. 7 is a cross sectional view showing the positioner of FIG. 6 in a condition protruding from a surface of the body of the information processing apparatus.
Figure 8:
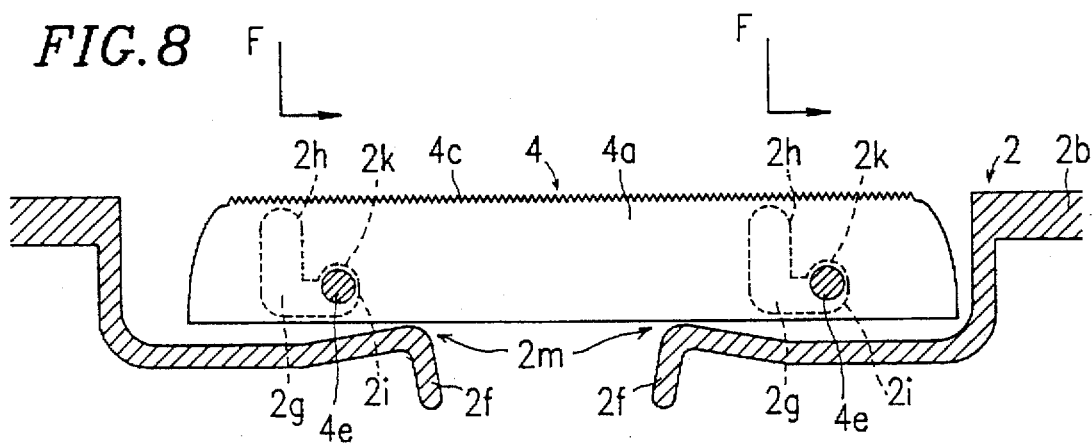
FIG. 8 is a cross sectional view showing the positioner of FIG. 6 in a condition accommodated in the body of the information processing apparatus so as to be essentially flush with the surface thereof.

FIGS. 7 and 8 show a cross sectional structure and operation of the positioner 4. FIG. 7 shows the positioner 4 at the first position protruding from the surface 2b of the body 2. As shown in FIG. 7, each of the elastic members 2f extends from the body 2 along the elongate direction of the positioner 4 in the concave portion 2c. Each of the elastic members 2f has an arm shape in a cross section. An end portion of each of the elastic members 2f is bent so as to form an engager 2m. Each of the engagers 2m engages with the bottom face 4b so as to bias or press the positioner 4 upward with its elastic force. As a result, each of the projecting members 4e abuts against a top end 2h of the corresponding guide slot 2g, so that the positioner 4 is fixed at the first position protruding from the surface 2b of the body 2.

When the keys displayed in the input regions 30b are changed so that the positioner 4 does not correspond to a boundary of the keys, the positioner 4 is slid from the first position to the second position as shown in FIG. 8. As shown in FIG. 8, the positioner 4 is slid along an L-shaped path (i.e., downward and then rightward in FIG. 8) guided by the guide slots 2g with the projecting members 4e engaged therein.

Each of the guide slots 2g includes a cut-out 2k at a bottom end portion 2i. The cut-out 2k receives the projecting member 4e when the positioner 4 is slid fully rightward (with respect to the orientation shown in FIG. 8) by the operator and pressed upward by the elastic members 2f. Accordingly, each of the projecting members 4e is engaged in the cut-out 2k of the corresponding guide slot 2g, so that the positioner 4 is fixed at the second position accommodated in the body 2 so as to have the top of the sensing portion 4a flush with the surface 2b of the body 2. Engagement of projecting member 4e with the cut-out 2k prevents the positioner 4 from sliding unnecessarily.

The positioner 4 is slid against the elastic force of the elastic members 2f as a result of being pressed by a finger of an operator or a tip of a thin member such as a ball point pen. To move from the position shown in FIG. 7 to the position shown in FIG. 8, a downward force is exerted on the top of the sensing portion 4a followed with the addition of a rightward force as represented by arrows F in FIG. 8. In order to move the positioner 4 from the position shown in FIG. 8 to the position shown in FIG. 7, a downward force is exerted on the top of the sensing portion 4a which is then combined with a leftward force and then the positioner 4 is released into the position shown in FIG. 7. When the sliding is completed to the first or second position, the projecting members 4e are engaged in a predetermined end (2h or 2k) of the guide slot 2g. Each of the projecting members 4e is fixed at the predetermined end (2h or 2k) of the guide slot 2g by the elastic force of the elastic members 2f so that the positioner 4 is held at the first or second position.

As described above, the positioners can be changed to the respective conditions (protruding or flush) according to the position and size of the keys, so as to indicate the necessary positions of the keys and to be sensed by operators with the sensing portions thereof. Therefore, operators can easily find and distinguish the keys even when position and size of the keys are changed, by sensing the positioners indicating the keys. This makes it possible to realize efficient data input.

EXAMPLE 2

Figure 9:
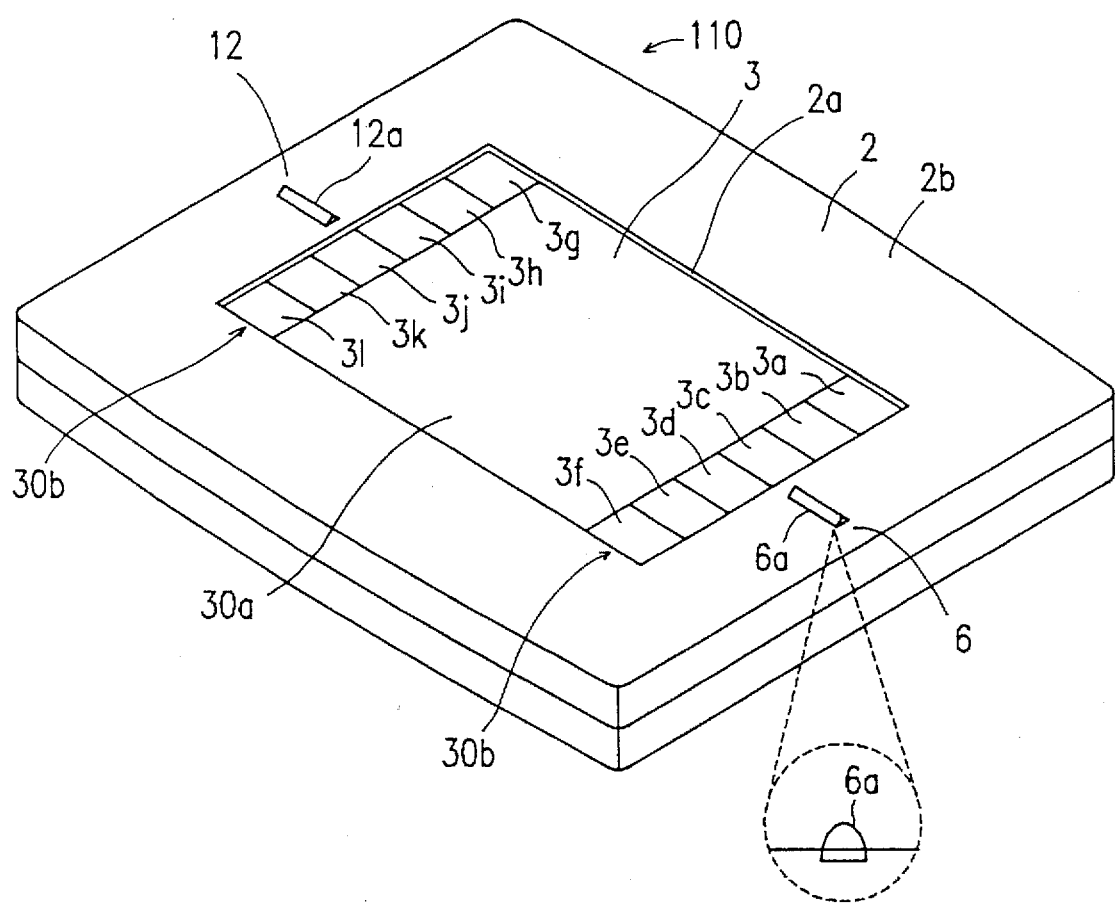
FIG. 9 is a perspective view showing a structure of an information processing apparatus in another embodiment of the present invention.
Figure 10:
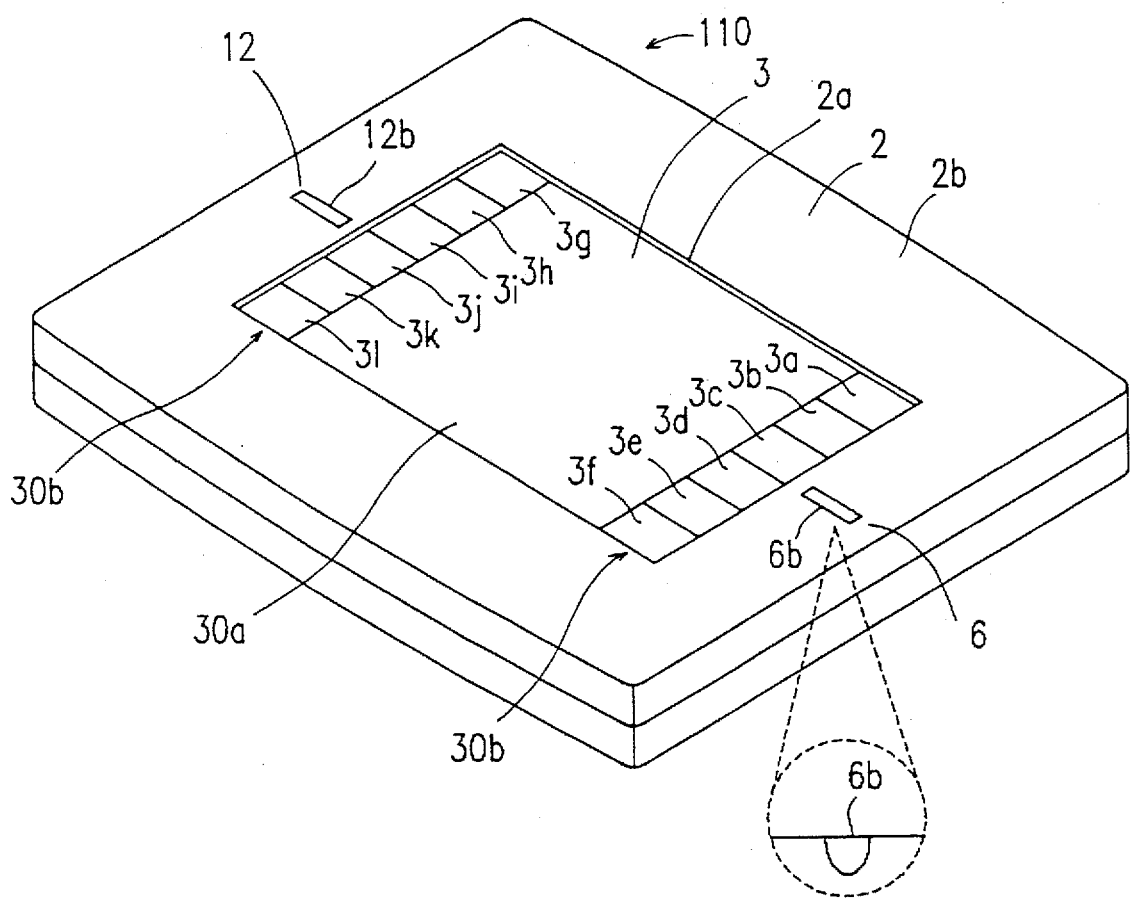
FIG. 10 is a perspective view showing the information processing apparatus of FIG. 9 with the positioners in a different condition.

FIGS. 9 and 10 show a overall structure of an information processing apparatus 110 according to a second example of the present invention. As shown in FIG. 9, the information processing apparatus 110 includes a body 2 having an opening 2a in the center thereof, a display panel 3 disposed in the opening 2a, and positioners 6 and 12 provided on a surface 2b of the body 2. The positioners 6 and 12 are placed in the vicinity of respective sides of the opening 2a.

The display panel 3 includes a display region 30a for displaying information and input regions 30b for displaying keys for inputting data. Data is input to the information processing apparatus 110 by touching the keys 3a–31 displayed in the input regions 30b of the display panel 3. The number, position, and size of the keys are variable in the input region 30b, as described above in Example 1.

In this example, the input regions 30b are provided on opposite sides of the display panel 3. The positioners 6 and 12 are located in the vicinity of the opening 2a, so as to correspond to a respective input region 30b, helping operators to distinguish the position of the input regions 30b.

As shown in FIGS. 9 and 10, each of the positioners 6 and 12 is convertible from a first position for protruding from the surface 2b of the body 2 into a second position accommodated in the body 2 so as to be flat along the surface 2b, and vice versa. Operators can sense the positioners 6 and 12 at the respective first positions protruding from the surface 2b. The structure of the positioners 6 and 12 can be the same as that of the positioner 4 as explained above in connection with FIGS. 3–5 or FIGS. 6–8, for instance.

In this example, the positioners 6 and 12 are provided so as to indicate generally the input regions 30b, rather than indicating specifically each of the keys 3a–31 in the input regions 30b. This minimizes the number of the positioners formed on the body 2 so that the manufacturing cost of the information processing apparatus 110 can be reduced. In the case where the number of the keys which are displayed in the input region 30b is not large, a minimum number of the positioners can make it possible for operators to easily find the input region 30b so as to input data quickly and correctly.

EXAMPLE 3

Figure 11:
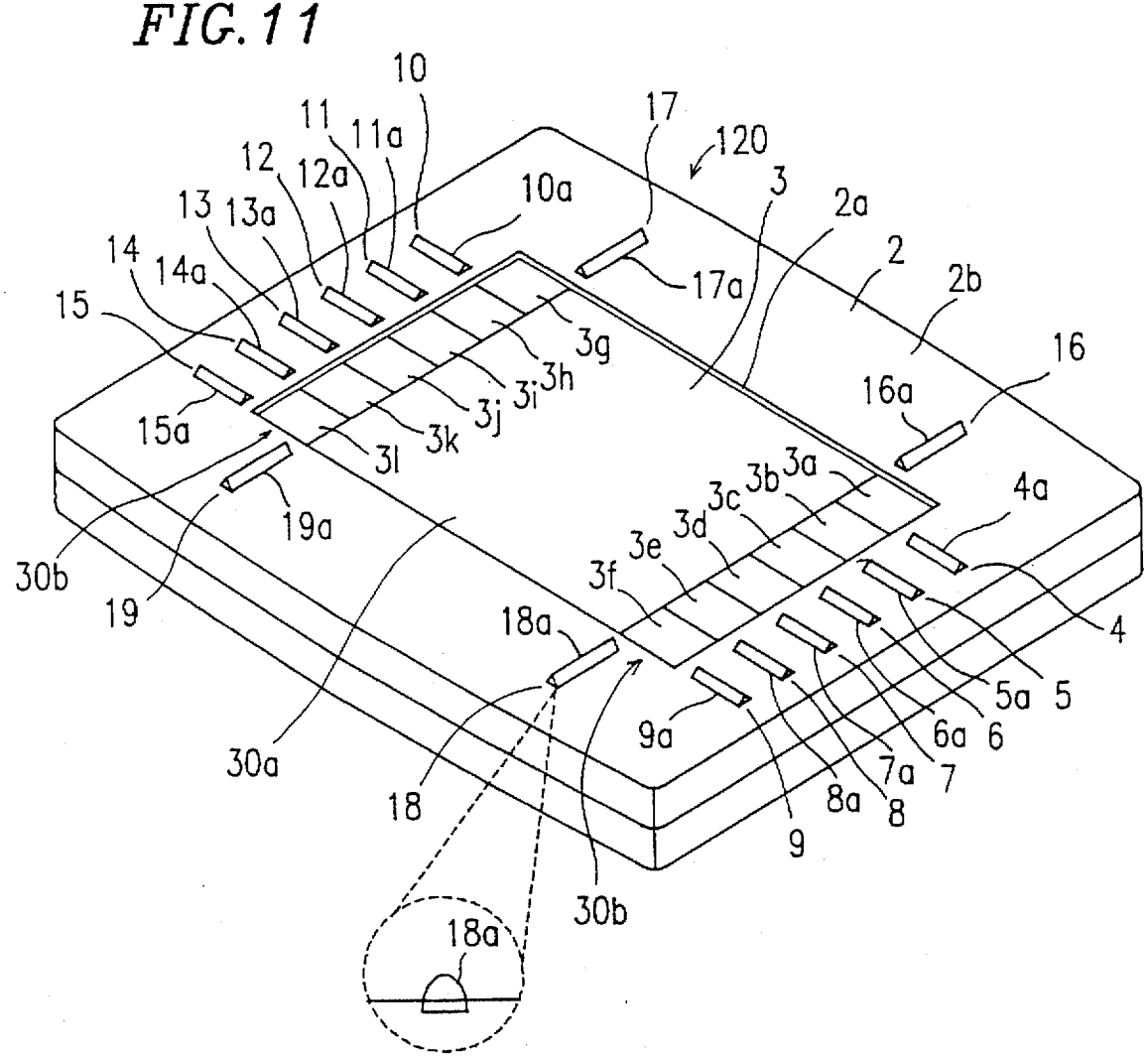
FIG. 11 is a perspective view showing a structure of an information processing apparatus in still another embodiment of the present invention.
Figure 12:
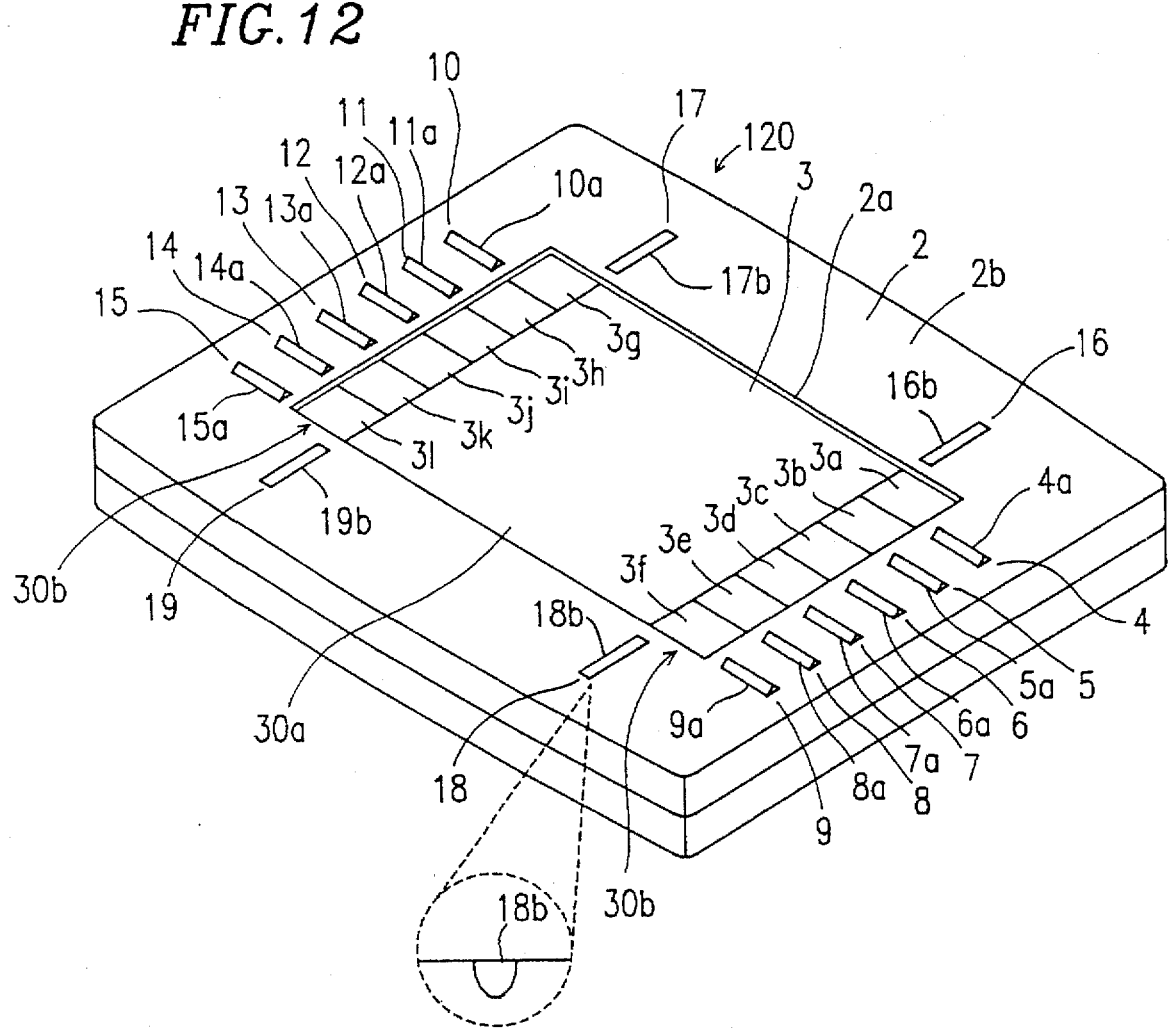
FIG. 12 is a perspective view showing the information processing apparatus of FIG. 11 with the positioners in a different condition.

FIGS. 11 and 12 show a overall structure of an information processing apparatus 120 in accordance with another example of the present invention. As shown in FIG. 11, the information processing apparatus 120 includes a body 2 having an opening 2a in the center thereof, a display panel 3 disposed in the opening 2a, and positioners 4–19 provided on a surface 2b of the body 2. The positioners 4–19 are placed in the vicinity of the opening 2a along the sides thereof.

The display panel 3 includes a display region 30a for displaying information and input regions 30b for displaying keys for inputting data. Data is input to the information processing apparatus 120 by touching the keys 3a–3l displayed in the input regions 30b of the display panel 3. The number, position, and size of the keys are variable in the input region 30b, as described in Example 1. In this example, the input regions 30b are provided on opposite sides of the display panel 3.

The positioners 4–19 are located so as to correspond to the input region 30b in the vicinity of the opening 2a, helping operators to distinguish the position of the input regions 30b. As shown in FIGS. 11 and 12, each of the positioners 4–19 is convertible from a first position for protruding from the surface 2b of the body 2 into a second position accommodated in the body 2 so as to be flat along the surface 2b, and vice versa. Operators can sense the positioners 4–19 at the respective first positions protruding from the surface 2b. The structure of the positioners 4–19 can be the same as that of the positioner 4 as explained above in connection with FIGS. 3–5 or FIGS. 6–8, for instance.

As in the case of Example 1, the input regions 30b are provided on opposite sides in the display panel 3 in this example. The input regions 30b are divided into a plurality of sub-regions, and each key is displayed using at least one sub-region. Each key can be displayed using an arbitrary number of sub-regions.

Among the positioners 4–19, the positioners 4–15 are provided so as to correspond to boundaries of sub-regions and one end of the input region 30b (one edge of the opening 2a). The positioners which correspond to boundaries of the keys or one end of the input region 30b are set at the first position protruding from the surface 2b of the body 2. The positioners which do not correspond to boundaries of the keys or any end of the input region 30b are set at the second position accommodated in the body 2.

As shown in FIG. 11, the positioners 16–19 are provided so as to correspond to boundaries between the display region 30a and the input regions 30b. The positioners 16–19 help operators to distinguish the input regions 30b from the display region 30a. As shown in FIG. 12, when the boundaries between the display region 30a and the input regions 30b are not required to be indicated, the positioners 16–19 are accommodated in the body 2 at the second position so as to be flat along the surface 2b.

For example, when the keys are displayed in only one of the input regions 30b, those of the positioners 16–19 which do not correspond to the input region 30b are set at the second position so as to be accommodated in the body 2. In the case where the keys are displayed using a part of the input regions 30b, for example, when the keys 3a–3c and 3g–3i are displayed in the respective input regions 30b, the positioners 4–6, 10–12, 16, and 17 are set at the first position protruding from the surface 2b. Other positioners are set at the second position so as to be accommodated in the body 2. Thus, operators can easily distinguish positions of the keys 3a–3c and 3g–3i which are to be used.

As described above, according to the information processing apparatus 120 of Example 3, operators can easily distinguish the input regions 30b and positions of the keys displayed in the input regions 30b, helped by the positioners 4–19. This makes it possible to input data quickly and accurately even when keys are changed in the number, position, and size thereof.

As described above, according to the present invention, an information processing apparatus is realized in which data is input via input regions displayed in a display panel quickly and accurately by providing positioners. The positioners indicate the input region and/or positions of the keys displayed in the input region, and are convertible in accordance with the number, position, and size of the displayed keys. Therefore, operators can input data quickly and accurately even when keys are changed in the number, position and size thereof, helped by the positioners which are set so as to protrude corresponding to the keys currently displayed.

The positioners are provided on the body of the information processing apparatus and are convertible in accordance with the number, position, and size of the displayed keys. Therefore, it is not required to prepare optional positioners for different sets of the displayed keys, to exchange the positioners, or to keep the optional positioners, eliminating inconvenience for the operators.

In addition, the positioners of the present invention can be converted from the first to the second position and vice versa by rotation or sliding which represent relatively simple movement. The positioners are held by the elastic members at the predetermined first of second position. Thus, the positioners are easy to convert yet are fixed well at the appropriate positions thereof.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information processing apparatus comprising:
   a body having an opening and concave portions outside the opening;
   display/input means disposed in the opening, including a display region for displaying information and an input region for displaying keys for inputting data, the data being input by touching, the keys; and
   positioners received in the concave portions of the body in the vicinity of the opening corresponding to the input region, for indicating the input region.

2. An information processing apparatus according to claim 1, wherein the input region is placed along at least an edge of the opening and includes a plurality of key regions, and wherein the positioners are provided for at least each boundary of the key regions.

3. An information processing apparatus according to claim 2, further comprising positioners provided on the body corresponding to boundaries between the display region and the input regions.

4. An information processing apparatus according to claim 1, wherein the input region is provided in both sides in the display/input means along corresponding edges of the opening, and includes a plurality of key regions, and wherein the body comprises a pair of positioners each provided for the corresponding input region.

5. An information processing apparatus comprising:

a body having an opening;

a display/input means disposed in the opening, including a display region for displaying information and an input region for displaying keys for inputting data, the data being input by touching the keys; and positioners provided on the body in the vicinity of the opening corresponding to the input region, for indicating the input region;

wherein the positioners are convertible between a first position in which the positioners protrude from a surface of the body to be sensed and a second position in which the positioners are accommodated in the body so as not to protrude along the surface of the body;

wherein the body comprises:

concave portions provided with respect to the positioners for accommodating the positioners so as to be rotatable between the first and second position; and holding means provided in the respective concave portions for respectively fixing the positioners at the first or second position; and wherein each of the positioners includes a rugged face on a portion which is a top face when the positioner is at the first position protruding from the surface of the body.

6. An information processing apparatus comprising:

a body having an opening;

a display/input means disposed in the opening, including a display region for displaying information and an input region for displaying keys for inputting data, the data being input by touching the keys; and positioners provided on the body in the vicinity of the opening corresponding to the input region, for indicating the input region;

wherein the positioners are convertible between a first position in which the positioners protrude from a surface of the body to be sensed and a second position in which the positioners are accommodated in the body so as not to protrude along the surface of the body;

wherein the body comprises:

concave portions provided with respect to the positioners for accommodating the positioners so as to be slidable between the first and second position;

guide slots for guiding slide motion of the respective positioners; and holding means provided in the respective concave portions for respectively fixing the positioners at the first or second position.

7. An information processing apparatus comprising:

a body having an opening;

a display/input means disposed in the opening, including a display region for displaying information and an input region for displaying keys for inputting data, the data being input by touching the keys; and positioners provided on the body in the vicinity of the opening corresponding to the input region, for indicating the input region;

wherein the positioners are convertible between a first position in which the positioners protrude from a surface of the body to be sensed and a second position in which the positioners are accommodated in the body so as not to protrude along the surface of the body;

wherein the body comprises:

concave portions provided with respect to the positioners for accommodating the positioners so as to be slidable between the first and second position;

guide slots for guiding slide motion of the respective positioners; and holding means provided in the respective concave portions for respectively fixing the positioners at the first or second position; and wherein each of the positioners has projection members for engaging in the guide slots so as to slide guided by the guide slots, and wherein the holding means are elastic members.

8. An information processing apparatus comprising:

a body having an opening;

a display/input means disposed in the opening, including a display region for displaying information and an input region for displaying keys for inputting data, the data being input by touching the keys; and positioners provided on the body in the vicinity of the opening corresponding to the input region, for indicating the input region;

wherein the positioners are convertible between a first position in which the positioners protrude from a surface of the body to be sensed and a second position in which the positioners are accommodated in the body so as not to protrude along the surface of the body;

wherein the body comprises:

concave portions provided with respect to the positioners for accommodating the positioners so as to be slidable between the first and second position;

guide slots for guiding slide motion of the respective positioners; and holding means provided in the respective concave portions for respectively fixing the positioners at the first or second position; and wherein each of the positioners includes a rugged face on a portion which is a top face when the positioner is at the first position protruding from the surface of the body.

9. An information processing apparatus comprising:

a body having an opening;

a display/input means disposed in the opening, including a display region for displaying information and an input region for displaying keys for inputting data, the data being input by touching the keys; and positioners provided on the body in the vicinity of the opening corresponding to the input region, for indicating the input region;

wherein the positioners are convertible between a first position in which the positioners protrude from a surface of the body to be sensed and a second position in which the positioners are accommodated in the body so as not to protrude along the surface of the body.

10. An information processing apparatus comprising:

a body having an opening;

a display/input means disposed in the opening, including a display region for displaying information and an input region for displaying keys for inputting data, the data being input by touching the keys; and positioners provided on the body in the vicinity of the opening corresponding to the input region, for indicating the input region;

wherein the positioners are convertible between a first position in which the positioners protrude from a surface of the body to be sensed and a second position in which the positioners are accommodated in the body so as not to protrude along the surface of the body; and wherein the input region is divided into a plurality of sub-regions, a key being displayed using at least one sub-region, and wherein the positioners are provided for at least each boundary of the sub-regions, positioners corresponding to a boundary of the keys being set at the first position, while positioners not corresponding to a boundary of the keys being set at the second position.

11. An information processing apparatus comprising:

a body having an opening;

a display/input means disposed in the opening, including a display region for displaying information and an input region for displaying keys for inputting data, the data being input by touching the keys; and positioners provided on the body in the vicinity of the opening corresponding to the input region, for indicating the input region;

wherein the positioners are convertible between a first position in which the positioners protrude from a surface of the body to be sensed and a second position in which the positioners are accommodated in the body so as not to protrude along the surface of the body;

wherein the body comprises:

concave portions provided with respect to the positioners for accommodating the positioners so as to be rotatable between the first and second position; and holding means provided in the respective concave portions for respectively fixing the positioners at the first or second position.

12. An information processing apparatus comprising:

a body having an opening;

a display/input means disposed in the opening, including a display region for displaying information and an input region for displaying keys for inputting data, the data being input by touching the keys; and positioners provided on the body in the vicinity of the opening corresponding to the input region, for indicating the input region;

wherein the positioners are convertible between a first position in which the positioners protrude from a surface of the body to be sensed and a second position in which the positioners are accommodated in the body so as not to protrude along the surface of the body;

wherein the body comprises:

concave portions provided with respect to the positioners for accommodating the positioners so as to be rotatable between the first and second position; and holding means provided in the respective concave portions for respectively fixing the positioners at the first or second position; and wherein each of the positioners rotates around an axis, the axis being engaged in axis holes which are provided in the concave portion; and wherein the holding means is an elastic member.

* * * * *